(12) United States Patent
Fernandez (10) Patent No.: US 8,783,131 B2
(45) Date of Patent: Jul. 22, 2014

(54) LOCKING ARRANGEMENT FOR A PARKING BRAKE

(75) Inventor: Jose Manuel Gutierrez Fernandez, Sobremazas (ES)

(73) Assignee: Edscha Engineering GmbH, Remscheid (DE)

( * ) Notice: Subject to any disclaimer, the term of this patent is extended or adjusted under 35 U.S.C. 154(b) by 116 days.

(21) Appl. No.: 13/121,225

(22) PCT Filed: Sep. 29, 2009

(86) PCT No.: PCT/EP2009/007005
§ 371 (c)(1),
(2), (4) Date: Jun. 20, 2011

(87) PCT Pub. No.: WO2010/034521
PCT Pub. Date: Apr. 1, 2010

(65) Prior Publication Data
US 2011/0239812 A1 Oct. 6, 2011

(30) Foreign Application Priority Data

Sep. 29, 2008 (DE) .......................... 10 2008 049 333
Nov. 11, 2008 (DE) .......................... 10 2008 056 752

(51) Int. Cl.
*G05G 1/04* (2006.01)
(52) U.S. Cl.
USPC .......................................................... 74/523
(58) Field of Classification Search
USPC .............................. 74/519, 523, 535, 536, 537
See application file for complete search history.

(56) References Cited

U.S. PATENT DOCUMENTS

| 4,872,368 | A | 10/1989 | Porter |
| 5,303,610 | A | 4/1994 | Noel et al. |
| 6,508,341 | B1 * | 1/2003 | Hiura ............................. 188/265 |
| 6,662,676 | B2 * | 12/2003 | Dittmar et al. ........... 74/501.5 R |
| 6,817,264 | B2 | 11/2004 | Hiura et al. |
| 2003/0177856 | A1 | 9/2003 | Reese et al. |

FOREIGN PATENT DOCUMENTS

| CN | 201080181 Y | 7/2008 |
| DE | 102 12 673 A1 | 10/2003 |
| DE | 102 17 473 C1 | 10/2003 |
| EP | 0 509 870 A1 | 10/1992 |

(Continued)

OTHER PUBLICATIONS

Translation of PCT International Preliminary Report on Patentability for corresponding International application No. PCT/EP2009/007005.

*Primary Examiner* — Vicky Johnson
(74) *Attorney, Agent, or Firm* — Davidson, Davidson & Kappel, LLC (57) ABSTRACT

A locking arrangement for locking a brake part held under tension is provided. The locking arrangement includes a gearing having a plurality of adjoining gears, a catch which can be pivoted about a catch coupling and which has at least one engaging nose that is biased in the direction toward the gearing on one engagement end. Either the catch coupling or the gearing can be pivoted about a main axis relative to each other, and a parking brake equipped with the locking arrangement. A locking arrangement, or a parking brake enabling an improved locking is created in that an auxiliary nose is associated with the catch at a distance from the engaging nose, and that the auxiliary nose is disposed such that it may be brought into contact with the gearing in front of the engaging nose.

20 Claims, 3 Drawing Sheets

(56) References Cited

FOREIGN PATENT DOCUMENTS

| EP | 1 258 405 | A1 | 11/2002 |
| JP | H05-056710 | U1 | 3/1993 |
| JP | 9267729 | A | 10/1997 |
| JP | 2008-044567 | | 2/2008 |

* cited by examiner

LOCKING ARRANGEMENT FOR A PARKING BRAKE

This application claims the benefit of German Patent Application DE 10 2008 049 333.3 filed Sep. 29, 2008 and German Patent Application DE 10 2008 056 752.3 filed Nov. 11, 2008, both of which are hereby incorporate by reference herein.

The invention relates to a locking arrangement for a parking brake for locking a brake part held under tension.

BACKGROUND

Locking arrangements for locking brake parts held under tension are known in practice and, in said locking arrangements, a first brake part has a tooth system, into which a catch provided on a second brake part engages by means of an engaging nose and thereby secures the two parts relative to one another in terms of rotary motion. By way of example, a locking arrangement of this kind is provided for locking the brake actuating lever on a lever holder or for locking a brake cable adjustment device when the brake actuating lever is raised and the free movement of the adjustment device is supposed to be blocked.

In known locking arrangements, there is a problem that, at certain lowering angles, an engaging nose shaped in the form of a tooth comes into contact with a tooth of the tooth system in such a way that the static friction is sufficient to achieve metastable retention of the catch provided with the engaging nose, but this is still not a positive-locking position of engagement between two tooth flanks of the tooth system. This metastable position, which is also referred to as "half locking", may be overcome in the event of shocks or the like, with the possible result that the engaging nose enters the depression between two adjacent tooth flanks and reaches a stable locking position, there is, however, a risk that instead the engaging nose slides off and, under the tension of the brake cable, slides into the lowered brake position with the brake actuating lever, the result being that the parking brake is no longer secured. A metastable position is adopted especially when the tangents to those areas of the engaging nose and of the tooth of the tooth system which come into contact are approximately parallel.

DE 102 12 673 A1 shows a locking arrangement for locking a brake part which is held by the tension of a spring, is designed as a cable tensioning disk and is pivotable about a main axis, where a tooth system with a plurality of adjacent teeth is provided on the cable tensioning disk. For engagement in the tooth system of the cable tensioning disk, a catch that can be pivoted about a catch coupling is disposed pivotably on a brake actuating lever, said catch having, at an engagement end, an engaging nose biased in the direction toward the tooth system and comprising three teeth, which is designed in such a way that all three teeth of the engaging nose correspond, at uniform intervals to one another, with the tooth pitch of the tooth system and can engage fully in the tooth system. When the catch enters the tooth system, a first tooth of the catch engages in the tooth system first of all and, given contact with the tooth system, the catch should pivot into an engagement position in which all three teeth of the engaging nose engage in the tooth system. The disadvantage with the known locking arrangement is, on the one hand, the required play in the pivot of the catch, this being necessary in order initially to insert just one, first tooth. Owing to the equidistant tooth intervals, there is furthermore the risk that all the tooth tips of the teeth of the engaging nose will come into contact outside the recesses of the tooth system, thereby allowing the catch to slide off. An auxiliary nose spaced apart from the engaging nose is not shown.

SUMMARY OF THE INVENTION

It is the object of the invention to specify a locking arrangement for locking a brake part held under tension and to specify a parking brake which allows improved locking.

The locking arrangement according to the invention for locking a brake part held under tension has, on one brake part, a tooth system having a plurality of adjacent teeth, and, on the other brake part, a catch, which can be pivoted about a catch coupling and which has at least one engaging nose that projects at an engagement end of the catch and is biased in the direction toward the tooth system, with the result that, when pivoted, the engaging nose can prevent reverse rotation in an effective manner by engaging between two adjacent teeth of the tooth system. For this purpose, the coupling and the tooth system can be pivoted relative to one another about a main axis, although it is expedient if one of the two brake parts is designed to be non-rotatable relative to the main axis. In addition to the engaging nose, the catch is assigned an auxiliary nose, which is disposed at a distance from the engaging nose, it being ensured that, when the catch is pivoted in the direction toward the tooth system, the auxiliary nose comes into contact first. The auxiliary nose thus forms a kind of auxiliary bearing location, about which the engaging nose can pivot by a certain amount, thus ensuring that the engaging nose is introduced in a defined manner into a space between two teeth of the tooth system. The tooth system can be designed as a toothed segment.

Especially when, in accordance with a particularly preferred embodiment, the distance between the effective areas of the engaging nose and the auxiliary nose, that is to say, in the case of embodiment as teeth, the toothed comb thereof, has a value that differs from an integral multiple of the tooth width of one tooth of the tooth system, it is ensured that the engaging nose is inserted into a stable position between two teeth of the tooth system. This occurs according to the following principle of action: if the auxiliary tooth is disposed in a stable position, pivoting about the auxiliary bearing location formed in the tooth system by the auxiliary tooth effects secure and reliable positioning of the engaging nose between two adjacent teeth of the tooth system and hence reliable locking. If the auxiliary tooth is in a metastable position of engagement, the non-integral distance with respect to the engaging nose ensures that the engaging nose is not in any event pivoted into a region in which the engaging nose would adopt a metastable position. As a result, the engaging nose always enters into a stable position. Adding a value of one quarter of a tooth to the integral tooth interval in order to define the distance between the engaging tooth and the auxiliary tooth is particularly preferred. The metastable zone, which should be avoided, generally accounts for no more than a maximum of 15% of one tooth pitch or one tooth width, thus ensuring that the engaging tooth and the auxiliary tooth do not simultaneously come into contact with a metastable zone of this kind.

It is expedient if the auxiliary nose is disposed closer to a plane connecting the catch coupling and the main axis than the engaging nose. Ideally, this ensures that the plane connecting the two axes, namely the catch coupling and the main axis, is crossed during the lowering movement by the auxiliary tooth forming an auxiliary bearing location as the catch is lowered further, with the result that the force acts essentially on the engaging nose and moves the latter reliably into the tooth system. Owing to the effective lever ratios, however, this has the effect in all cases that the force acting on the engaging nose is greater than that acting on the auxiliary nose.

It is expedient if the auxiliary nose is spaced apart from the engaging nose by a plurality of teeth and precedes the engaging nose in relation to the tooth system in the direction of application. In order to provide an effective auxiliary bearing location, it is expedient here if the distance between the engaging nose and the auxiliary nose amounts to at least a plurality of teeth, i.e. a multiple of the pitch or tooth width of the tooth system, preferably twice this number and possibly up to more than five times and generally not more than about seven to ten teeth; in general, the distance also depends on the selected tooth pitch, wherein a distance which is not an integer is preferred. The result is that the tooth system or toothed segment is also made correspondingly longer by this number of teeth than would be necessary for actual locking. In general, the tooth system is equipped with additional teeth in any case in order to enable a higher tension to be applied when the brake cable relaxes. However, it is also possible to provide the additional portion in a connecting segment outside the tooth system since this segment is not stressed as severely as that part of the toothed segment in which the engaging nose engages. In practice, a number of teeth corresponding to an application angle of 2°, increased or reduced by an amount less than 1, that is to say, for example, a value of 2.25 teeth with one tooth per degree of angle, or 4.25 teeth with two teeth per degree of angle, can be selected as an appropriate distance. However, it is also possible to select a value corresponding to an application angle of 3°, 4° or 5°, increased or reduced by a fraction less than 1. The surprising fact here is that an appropriate torque is achieved even when the distance is quite small. If the auxiliary nose is spaced apart from the engaging nose by a distance of two tooth widths, a gap corresponding to one tooth width is provided between the engaging nose and the auxiliary nose. However, this gap will preferably amount to a non-integral multiple of one tooth width.

The auxiliary nose assigned to the catch is preferably disposed on the catch itself, with either pivotable arrangement by way of a connecting joint or integral formation with the catch being possible. The integral configuration, in particular, has the advantage that, by virtue of the known distance with respect to the engaging nose, reliable engagement kinematics can be achieved, a specific bearing location is not required and the catch is simple to manufacture.

The auxiliary nose is preferably made narrower than the engaging nose, with the engaging nose generally being designed in such a way that it can enter snugly between two adjacent teeth of the tooth system. If the distance with respect to the auxiliary nose is a non-integral multiple of the tooth width, this has the effect, given snug entry of the engaging nose into the tooth system, that the auxiliary nose cannot enter fully into a corresponding recess between two different teeth of the tooth system but, on the contrary, is moved out of the bottom of the trough between two adjacent teeth. In order to prevent jamming during this process, the auxiliary nose is made narrower than the engaging nose, with the difference amounting to approximately one quarter to one half of the dimensions of the engaging nose. As an alternative, it is also possible, in particular, to make the engaging nose very much thicker in order to prevent it from entering the tooth system at all, in particular to design it as a ball or the like, which can be centered reliably and reproducibly by two tooth tips of the tooth system and can thus define an auxiliary bearing location.

It is expedient if the catch is biased in the direction toward the tooth system and, according to a first embodiment, this can be accomplished by means of a spring which acts on the locking catch and is provided solely for this purpose. According to another embodiment, the locking catch can also be designed as a double-armed lever, and the bias can be provided by a spring member, which either biases the catch formed by one of the two lever arms against the other lever arm or, in the case of a rigid or semirigid embodiment of the two lever arms, by a spring which biases, in particular pulls, the second of the two lever arms.

The catch coupling is preferably provided with play, thereby particularly promoting the rolling of the auxiliary nose on the tooth system and ensuring that unintentional blocking of the rolling movement about the auxiliary coupling does not occur, especially in the situation of metastable contact of the auxiliary nose with the tooth system. One particularly preferred possibility is to embody the play in the form of an elongate hole or an elliptical eye hole in certain orientations, and noise generation can be suppressed by a slightly deformable bushing, but the tolerance inherent in the bearing can be used as play. In corresponding fashion, the eye hole can also have a defined gap relative to the pin inserted, which is preferably provided on the side opposite the auxiliary nose.

The auxiliary nose is preferably of tooth-shaped design, thereby ensuring reliable and reproducible engagement into the tooth system to form an instantaneous positive-locking joint, with the exception of metastable contact with the tooth flank of a tooth of the tooth system, the percentage likelihood of which is low. However, it is possible to embody the auxiliary nose with other geometries, e.g. as a ball or in the form of a spherical cap or as a small gear segment, these particularly promoting the rolling movement.

It is expedient if the auxiliary nose is disposed closer to the catch coupling than the engaging nose, the engaging nose being disengaged further than the auxiliary nose, owing to the movement of the catch when the latter is pulled over the tooth system, with the result that the auxiliary nose essentially rattles over the tooth system, generating noise in the process. Here, the characteristic rattling noise can be reduced by means of split catches or the like, as in the prior art, but preferably by the auxiliary nose comprising a damping arrangement which exploits the play in the catch coupling, for example. Moreover, the auxiliary nose can be made from a particularly robust yet low-noise plastic. A damping arrangement can be formed by a damping member, e.g. by an elastomer material, which is disposed in the catch coupling and lines a gap, with the result that noise and vibration are damped by the damping member. In particular, the damping member can be designed as a thickened portion of a bushing made, for example, of Teflon, which lines the gap.

The biasing of the auxiliary nose and of the engaging nose is preferably performed by a common spring member, so that the auxiliary nose does not require its own biasing device in relation to the engaging nose, as would be the case if the auxiliary nose were biased automatically. By virtue of the lever ratios, the effective force on the engaging nose is greater than on the auxiliary nose, with the result that the final locking of the locking arrangement is accomplished by the engaging nose.

According to a first embodiment, the engaging nose has a tooth which projects in the direction toward the tooth system and, when it enters the tooth system, is inserted substantially in a positive-locking manner between two adjacent teeth or the mutually facing tooth flanks thereof. It is also possible to design the engaging nose as a small toothed segment, in particular as a segment comprising two teeth, thereby further increasing the security of retention on the tooth system since the tooth of the tooth system which enters between the adjacent teeth of the engaging nose designed as a double tooth is gripped reliably in a positive-locking manner.

It is expedient if the tooth system extends along the circumference of a circle and thus forms a toothed comb which extends in a circle around the main axis. This makes it possible, simply by pivoting about a single axis, to pivot the catch coupling effectively about a constant radius concentric with the circumference of the tooth system. However, it is possible to adapt the tooth system to the respectively chosen pivoting curve, e.g. when the catch is moved along a curve such as that achieved by means of a four-bar linkage arrangement, for example.

It is expedient if the tooth system is disposed on a fixed part of a parking brake and, in particular, the tooth system can be designed as a toothed segment which is fixed on the fixed part. This enables the fixed part to be produced economically, while the particularly wear-resistant tooth system can be designed as a toothed segment, e.g. as a sintered hard-metal component, and be held on the fixed part. However, it is also possible to fix the tooth system on a moving part, in which case the catch coupling selected is preferably fixed relative to the moving tooth system.

According to a first preferred use, the locking arrangement is designed for fixing a brake actuating lever on a lever holder of a parking brake, in which case the tooth system is fixed on the lever holder and the catch is fixed on the brake actuating lever, for example, with the brake actuating lever being designed to be pivotable around the main axis and the tooth system so that, when the application movement of the brake actuating lever is complete, the engaging nose of the catch locks the brake actuating lever against the tooth system of the lever holder. A second preferred use consists in that a brake part biased counter to the outgoing direction of a brake cable forms a brake cable adjustment device and is equipped with a tooth system, which is fixed by a catch when the brake is actuated by the brake actuating lever, in order to prevent the brake cable adjustment device from yielding. Here, the catch can connect the brake cable adjustment device to a brake actuating lever, thus enabling them to be tightened/applied jointly. The brake actuating lever can be designed either as a hand grip for a manually operated parking brake or as a pedal for a foot-operated parking brake.

A parking brake according to the invention is preferably characterized by a locking arrangement according to the invention and has a brake actuating lever which is disposed pivotably on a lever holder. If the tooth system is disposed with a plurality of adjacent teeth on the lever holder, the catch with the engaging nose biased against the tooth system is fixed pivotably on the brake actuating lever, it being possible for the brake actuating lever to be locked by the engaging nose, which engages in the tooth system. In order to release the locking, a release device, by means of which the catch or engaging nose can be raised out of the tooth system, is required, said device generally being designed as a pushbutton on the hand grip in the case of a manually operated parking brake and generally being designed as a manually actuable handle in the case of a foot-operated parking brake. In this case, the catch has the auxiliary nose which is disposed offset in the braking direction relative to the tooth system of the engaging nose by a multiple of the tooth width of the tooth system, and thus makes possible an auxiliary bearing location.

It is expedient if the catch is biased in the direction of engagement by a spring unit, it being possible at the same time for the spring unit to bias the release device counter to the actuating direction thereof. The release device can then advantageously pivot the catch out of engagement against the bias of the spring unit, which excludes accidental actuation.

It is expedient if the catch coupling is provided on the brake actuating lever and, during application, the brake actuating lever pivots the catch coupling around the tooth system at an at least approximately constant distance from said tooth system in order to ensure forces that are as uniform as possible and uninterrupted locking positions.

Further advantages, developments and characteristics of the invention will emerge from the following description and from the appended claims.

BRIEF SUMMARY OF THE DRAWINGS

The invention is explained in greater detail below by means of a preferred illustrative embodiment with reference to the attached drawings.

DETAILED DESCRIPTION

Figure 1:
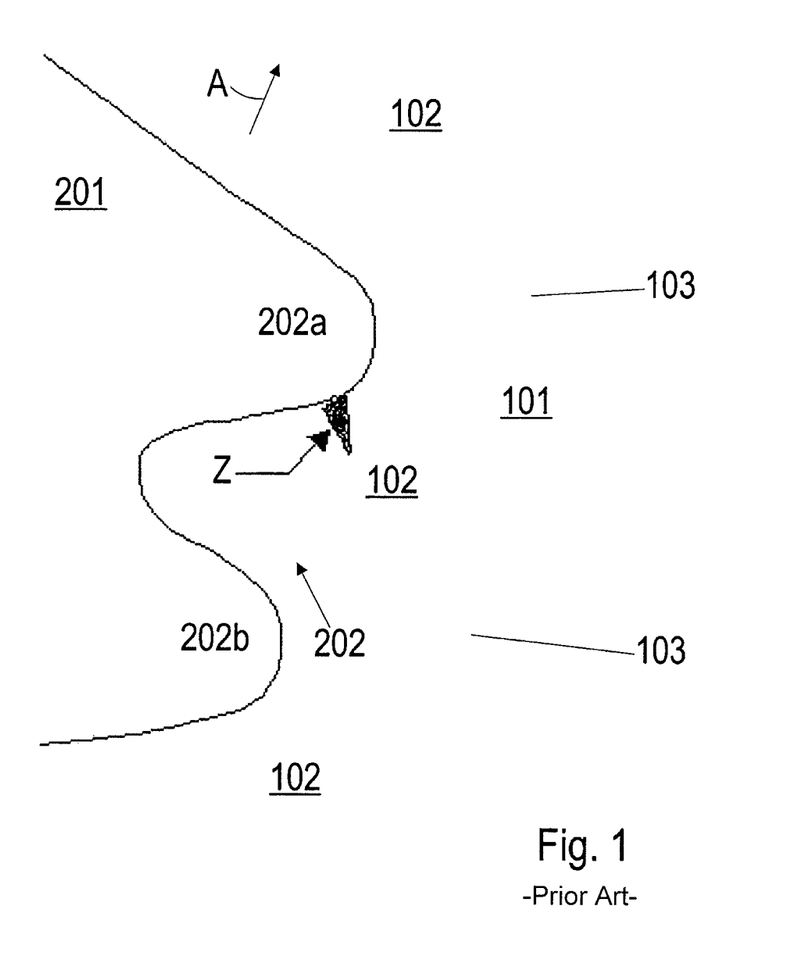
FIG. 1 shows an enlarged representation of an engaging nose that enters into engagement with teeth of a tooth system and is in a metastable position.

FIG. 1 illustrates the case where "half-locking" occurs, in which the engaging nose of a locking catch adopts only a metastable position in relation to a tooth system and there is a risk that it will slide off as a result of a shock. The tooth system 101 has a plurality of teeth 102 and has a profile of the approximately circular segment type, a tooth recess 103 being provided between adjacent teeth 102. When the parking brake is applied, a catch 201 is pivoted in the direction of arrow A until the brake actuating lever is lowered. In the illustrative embodiment shown, the catch 201 has an engaging nose 202 designed as a double tooth, with an upper tooth 202*a* and a lower tooth 202*b*. In order to achieve reliable locking, it is expected that the teeth 202*a*, 202*b* of the engaging nose 202 will enter the respective recesses 103 between adjacent teeth 102 of the tooth system 101. The parking brake is then reliably locked. In the contact position illustrated in FIG. 1, in which the tangents to the flanks of the teeth 102, 202*a* involved are approximately parallel, no effective force component in the direction toward the adjacent recess 103 is achieved, with the result that the tooth 202*a* rests on the tooth flank of the tooth 102 in a metastable position at the contact point. In principle, this zone Z, which is depicted as a segment of the radius of the tooth 102, is possible on each tooth in the corresponding part of the pivoting path of the catch 201 and endangers the safety of passengers of vehicles equipped with corresponding parking brakes. The starting and end points of zone Z, which are shown in FIG. 1, correspond to an angular range of about 13.5°, this angle being expressed as a pivoting angle about the main axis. This means that a situation in which the engaging nose comes into contact with any tooth 102 in this approximately 13.5° range should be avoided.

Figure 2:
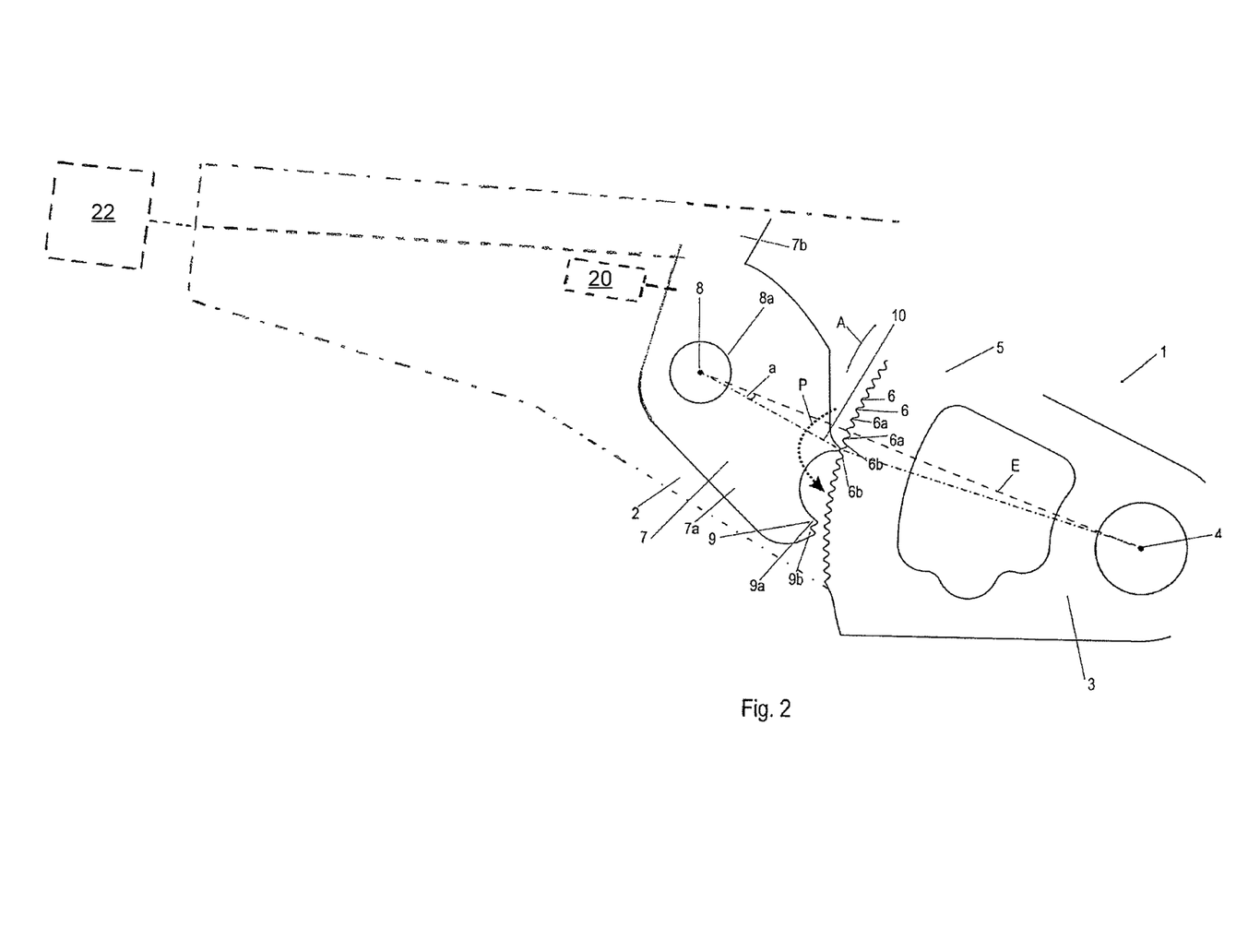
FIG. 2 shows an enlarged detail of a parking brake designed as a handbrake.
Figure 3:
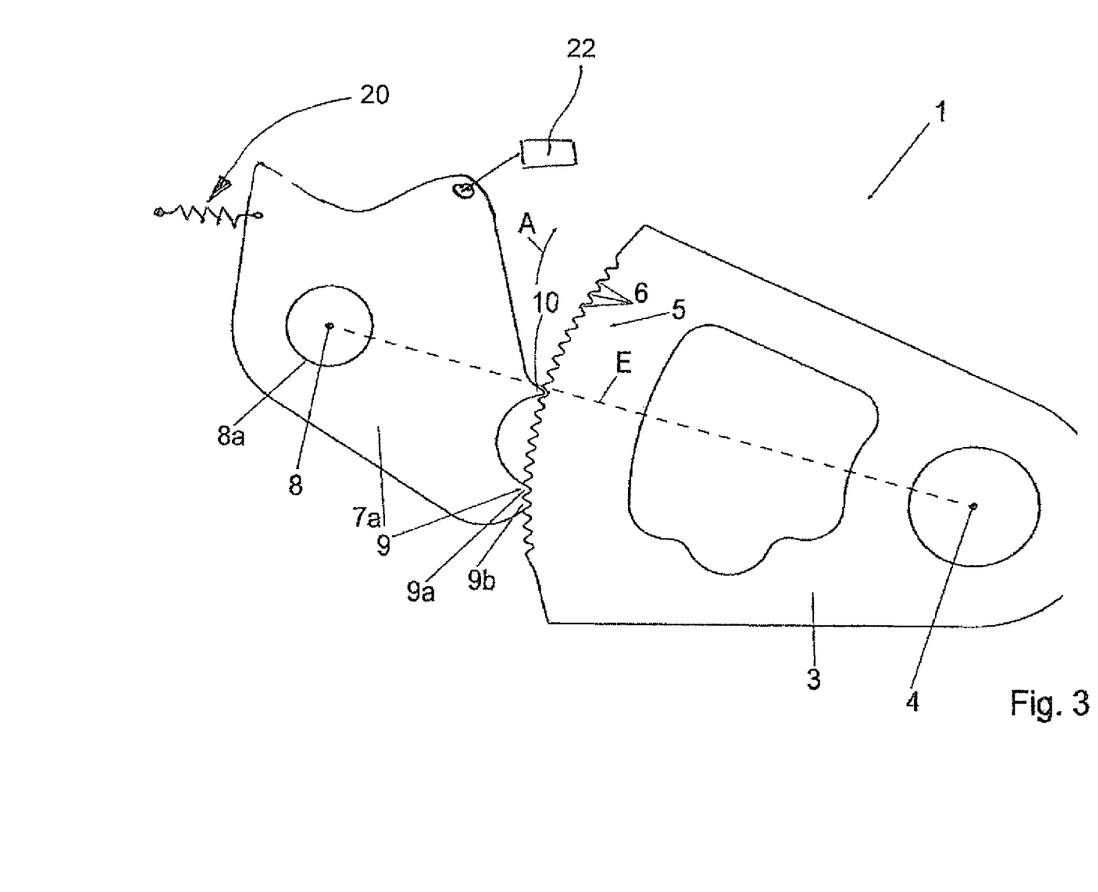
FIG. 3 shows another detail of the parking brake in FIG. 2 in a fixed position.

FIGS. 2 and 3 show a preferred illustrative embodiment of a parking brake 1 according to the invention, which is designed as a manually operated parking brake and has a brake actuating lever 2, only one portion of which is shown, which is coupled in such a way that it can pivot on a main axis 4 about a fixed part, which is a lever holder 3 connected to the body. The coupling on the main axis 4 is designed in a conventional manner as a bearing location for the brake actuating lever.

Disposed around the main axis 4 on the lever holder 3, on a circular segment with a constant radius, is a tooth system 5, in which the tooth pitch is chosen in such a way, for example, that each tooth accounts for 1° of pivoting angle of the brake actuating lever, with the result that the pitch of the tooth system accounts for 1 tooth/degree of angle. Formed between adjacent teeth 6 of the tooth system 5 there is in each case a recess 6b, which is provided approximately centrally between the combs 6a of the teeth 6. In the embodiment shown, the tooth system 5 is formed integrally with the lever holder 3, but it is possible for this purpose to provide a toothed segment, which is fixed, e.g. caulked, to the lever holder 3.

A catch in the form of a pawl 7 is mounted on the brake actuating lever 2 in such a way that it can pivot about a catch axis 8, the bearing location being designed as a riveted pin which passes through a corresponding hole 8a in the catch and in which the ability to rotate is ensured by means of a Teflon bushing disposed in the hole 8a.

The catch 7 has essentially two lever arms 7a and 7b, the first lever arm 7a comprising an engaging nose 9 and an auxiliary nose 10, and the second lever 7b having an abutment for a pushrod guided in a hand grip, thus allowing the pushrod to push the second lever 7b rearward, when a corresponding release device 22 (shown schematically in FIG. 3) is actuated, to ensure that the engaging nose 9 disengages from the tooth system 5. For this purpose, the brake actuating lever must first of all have been raised briefly. The catch 7 is biased relative to the brake actuating lever 2, in the direction toward the tooth system 5, by a spring 20 (shown schematically in FIG. 3), with the result that the catch 7 exerts a pressure in the direction of engagement on the tooth system 5 due to the bias of the spring 20 when the release device 22 is not actuated.

FIG. 2 shows a position of the parking brake while the brake actuating lever 2 is being locked. It can be seen that, when the brake actuating lever 2 is pulled in the locking direction A, the auxiliary nose 10, which is disposed closer to the catch axis 8 than the engaging nose 9, is pulled over the teeth 6 of the tooth system 5 and, in the process, produces a characteristic chattering movement as it overcomes the bias of the spring 20. If the application movement A is ended, the auxiliary tooth 10 is the first to come into contact with the tooth system 5, this taking place either in a metastable half-locking zone or in a region which leads to stable engagement of the auxiliary tooth 10 in a recess 6b between two adjacent teeth 6. In both cases, i.e. in a stable contact position and in a metastable contact position, the bias of the spring 20, which pushes the catch 7 in the direction toward the tooth system 5, has the effect that the engaging nose 9 is pivoted further in the direction toward the tooth system. Here, the contact point between the auxiliary nose 10 and the tooth system 5 defines an auxiliary bearing location, which has the effect that the pivoting of the engaging nose 9 takes place not merely around the catch axis 8 but also, at the same time, about the auxiliary bearing location, as indicated by the arrow P. Here, a play in the catch coupling 8a (i.e., pawl coupling 8a) is utilized, preventing the catch 7 from jamming in the position corresponding to the auxiliary bearing location. The play allows the catch coupling 8a to yield, thus enabling the engaging nose 9 to be inserted into the tooth system 5 in all cases, even when the auxiliary nose 10 is in contact.

The engaging nose 9 is designed as a double-tooth engaging nose, the actual engaging nose being formed by the upper engaging tooth 9a, while the second engaging tooth 9b serves essentially to engage behind that tooth 6 of the tooth system 5 which supports the engaging tooth 9a. However, it is also possible for locking to take place primarily by means of the second engaging tooth 9b. The toothed comb of the auxiliary nose 10 or of the engaging teeth 9a, 9b of the engaging nose 9 is spaced apart, relative to the profile of the tooth system 5, by 7¼ times a tooth width of the tooth system 5, and, at a pitch of 1 tooth/degree of angle, this corresponds to 7.25°. Here, the engaging nose 10 is designed to be narrower than the teeth 9a, 9b of the auxiliary nose 9, with the result that the auxiliary nose 10 does not jam when the engaging nose 9 is snugly seated, despite the non-integral distance in relation to the pitch of the tooth system 5; on the contrary, the auxiliary nose 10 of narrower design is pushed some way out of the recess 6b without this prejudicing the secure locking of the parking brake 1 by the engaging nose 9 locked in the tooth system 5.

When the engaging nose 10 is securely in the recess 6b of the tooth system 5, the bias of the spring 20 causes the catch 9 to pivot further in around the auxiliary bearing location formed by the engaging nose 10, and the proximity of these auxiliary bearing locations to the connecting plane between the mutually parallel main axis 4 and catch axis 8, which is indicated by a dashed line E, ensures that the auxiliary bearing location pivots through this connecting plane E and hence is rendered substantially free from force. This is an effective way of avoiding jamming or catching. For this purpose, it is expedient that, during the application movement of the parking brake in the direction of the arrow A, the auxiliary nose 10 is disposed close to the connecting plane E, preferably no more than two tooth widths away, and, in particular, that the opening angle a of the connecting line between the main axis 4 and the auxiliary bearing location is if possible less than or equal to three times the value of the tooth width, in the present case therefore 3°. In all cases, the engaging nose 9 is pivoted into the tooth system 5 outside a half-locking zone and hence reaches a stable position of engagement reliably and reproducibly.

If the auxiliary nose 10 is resting in a metastable position on the tooth system 5 in the region of a half-locking zone, the catch 7 pivots about the auxiliary bearing location formed by the auxiliary nose 10. The preset non-integral distance of the auxiliary nose 10 from the engaging nose 9 ensures that the engaging nose 9 never adopts a metastable bearing position on the tooth system 5 and, as a result, reliably enters a recess 6b.

The starting and end points of zone Z, which are shown in FIG. 1, are spaced apart by an angular range of about 13.5°, and this angle is expressed as a pivoting angle about the main axis 4. Selecting a distance between the engaging nose 9 and the auxiliary nose 11 which adds to an integral distance measured in tooth widths a fraction which is larger than said zone angle and is at a corresponding distance from the integral multiple ensures that it is impossible for the auxiliary nose 10 and the engaging nose 9 to adopt a metastable position simultaneously. At a zone angle of 15% at the maximum, the fraction of a tooth width to be added to the integral distance can be between 15 and 85% of the tooth width, and, for reasons of safety, a distance of at least 20% of a full tooth width should be maintained. Although a fraction of ½ offers the maximum distance with respect to the problem zones, the comb of the auxiliary nose 10 would then coincide with the comb 6a of a tooth 6 of the tooth system 5 and this should be avoided, if at all possible, for which reason the fraction selected is close to the limit values of +¼ or −¼.

The preferred embodiment of the invention functions as follows:

Starting from a lowered position of the brake actuating lever 2, said lever is moved in the direction A of application. During this process, the auxiliary tooth 10 first comes into contact with the tooth system 5 and is pulled over the teeth 6, overcoming the bias of the catch 7 tooth-by-tooth. Owing to the larger distance between the engaging nose 9 and the catch axis 8 in comparison with the auxiliary nose 10, the engaging nose 9 disengages completely from the tooth system 5. If the application movement A is stopped, the auxiliary nose 10 comes into contact first with the tooth system 5 and, through bearing contact, forms an auxiliary bearing location at the contact point thereof with the tooth system 5, about which the engaging nose 9 is pivoted in the direction toward the tooth system 5 owing to the bias of the spring 20 acting on the catch 7. The engaging nose 9 then enters into snug engagement with the tooth system 5, thus ensuring that contact with a meta-stable zone is prevented through the pivoting about the auxiliary bearing location. The engaging nose 9 then locks the parking brake 1.

If the parking brake 1 is to be disengaged again, release device 22 is actuated, pushing a pushrod against a surface facing the latter on the lever arm 7b and pivoting said lever arm about the catch axis 8 against the bias of the spring 20 acting on the catch 7. Owing to the preset travel of the pushrod, this means that both the engaging nose 9 and the auxiliary nose 10 move out of engagement with the tooth system 5 to such an extent that neither of the two noses 9, 10 hinders the lowering of the brake actuating lever 2. The brake actuating lever 2 can then be pivoted down again into the lowered position thereof. In the lowered position, the engaging nose 9 is lowered in a lowered range immediately in front of the tooth system 5, while the auxiliary nose 10 already projects into the tooth system 5 by the amount of the distance thereof from the engaging nose. Starting from this position, the parking brake 1 can be pulled back in the direction A of application.

It has to be understood that the pivoting movement about the auxiliary bearing location formed at the contact point of the auxiliary nose 10 with the tooth system 5 takes place before the completely lowered position is reached when the brake actuating lever 2 is being lowered as well, so that it is not only in the direction of application that reliable locking of the parking brake 1 is provided but also when the intention is, starting from a more tightly applied state of the brake actuating lever 2, to move said lever by a certain amount into a less tight position, which is however not yet the lowered position.

The invention has been explained above by means of an illustrative embodiment in which the auxiliary nose 10 is spaced apart from the engaging nose 9 by a quarter tooth width from an integral distance, measured in tooth widths. It has to be understood that other non-integral distances can also be considered with the exception of the angular range of the half-locking zone Z.

The invention has been explained above with reference to an illustrative embodiment in which the engaging nose 9 comprises two teeth 9a, 9b. It has to be understood that the engaging nose can also be designed with just one tooth or with more than two teeth.

The invention claimed is:

1. A locking arrangement for locking a brake part held under tension, comprising
   a tooth system having a plurality of adjacent teeth, and
   a catch, which can be pivoted about a catch coupling and which has at least one engaging nose that is biased in a direction toward the tooth system at an engagement end, the catch including an auxiliary nose at a distance from the engaging nose, the catch being formed as a single piece,
   wherein one of the catch coupling and the tooth system can be pivoted relative to the other about a main axis,
   wherein the auxiliary nose is disposed in such a way that it can be brought into contact with the tooth system before the engaging nose,
   wherein the auxiliary nose forms an auxiliary bearing location when engaging the tooth system, and
   wherein the engaging nose is pivotable around the auxiliary bearing location.

2. The locking arrangement as claimed in claim 1, wherein the auxiliary nose is disposed closer to a plane connecting the catch coupling and the main axis than the engaging nose.

3. The locking arrangement as claimed in claim 1, wherein the auxiliary nose is disposed ahead of the engaging nose by at least two teeth of the tooth system in a locking direction.

4. The locking arrangement as claimed in claim 1, wherein a distance between apexes of the auxiliary nose and of the engaging nose is a non-integral multiple of the tooth width of one tooth of the tooth system.

5. The locking arrangement as claimed in claim 4, wherein the distance is distanced by a one quarter tooth width from an integral multiple.

6. The locking arrangement as claimed in claim 1, wherein the auxiliary nose is configured narrower than the engaging nose.

7. The locking arrangement as claimed in claim 1, wherein the auxiliary nose is disposed on the catch, and wherein the catch is biased in a direction toward the tooth system.

8. The locking arrangement as claimed in claim 1, wherein the catch coupling is provided with play.

9. The locking arrangement as claimed in claim 1, wherein the auxiliary nose is configured as an engaging tooth.

10. The locking arrangement as claimed in claim 1, wherein the auxiliary nose is disposed closer to the catch coupling than the engaging nose, wherein the biasing of the auxiliary nose and of the engaging nose is performed by a same spring, and wherein an effective force on the engaging nose is greater than an effective force on the auxiliary nose.

11. The locking arrangement as claimed in claim 1, wherein the engaging nose is configured as a double tooth.

12. The locking arrangement as claimed in claim 1, wherein the tooth system extends along the circumference of a circle.

13. The locking arrangement as claimed in claim 1, wherein the tooth system is disposed on a fixed part of a parking brake.

14. A parking brake for a motor vehicle, comprising a locking arrangement for fixing a brake actuating lever on a lever holder, the locking arrangement comprising
   a tooth system having a plurality of adjacent teeth, and
   a pawl, which can be pivoted about a pawl coupling and which has at least one engaging nose that is biased in a direction toward the tooth system, the pawl including an auxiliary nose at a fixed distance from the engaging nose,
   wherein the pawl coupling can be pivoted with respect to the tooth system about a main axis,
   wherein the auxiliary nose is arranged such that it can be brought into contact with the tooth system before the engaging nose,
   wherein the auxiliary nose forms an auxiliary bearing location when engaging the tooth system, and
   wherein the engaging nose is pivotable around the auxiliary bearing location.

15. A parking brake for a motor vehicle, comprising
   a brake actuating lever which is pivotably coupled to a lever holder,
   a tooth system having a plurality of adjacent teeth,
   a catch having an engaging nose biased against the tooth system, wherein the brake actuating lever can be locked in a raised position by engagement of the engaging nose in the tooth system, and a release device, by means of which the engaging nose can be raised out of the tooth system, wherein the catch has an auxiliary nose, which, with respect to the tooth system of the engaging nose, is disposed offset in a direction of application of the brake actuating lever by a non-integral fraction of a tooth width of the tooth system, the fraction being greater than two.

16. The parking brake as claimed in claim 15, wherein the brake actuating lever is designed to be hand-operable.

17. The parking brake as claimed in claim 15, wherein the catch is biased in a direction of engagement by a spring.

18. The parking brake as claimed in claim 17, wherein a release device is provided which pivots the catch out of engagement with the tooth system against the bias of the spring.

19. The parking brake as claimed in claim 15, wherein a pawl coupling is provided on the brake actuating lever that can be pivoted about the coupling of the brake actuating lever at an at least approximately constant distance from the tooth system.

20. A parking brake for a motor vehicle, comprising a brake actuating lever which is pivotably coupled to a lever holder, a tooth system arranged on the lever holder and having a plurality of adjacent teeth, the teeth each having a tooth width, a pawl pivotably coupled to the brake actuating lever, wherein the pawl comprises a locking nose biased toward the tooth system for locking the brake actuating lever in a raised position by engagement of the locking nose and the tooth system, and a release device for disengaging the locking nose from the tooth system, wherein the pawl comprises an auxiliary nose disposed at a constant distance from the locking nose, wherein the locking nose is disposed ahead of the auxiliary nose, in a direction of brake operation of the brake actuating lever, and wherein the constant distance is equal to a non-integral multiple of the tooth width, such that when the brake actuating lever is operated, the auxiliary nose engages the tooth system and defines an auxiliary pivot point the locking nose is pivoted around for engaging the tooth system.

\* \* \* \* \*